(12) United States Patent
Tokumoto et al.

(10) Patent No.: US 12,728,472 B2
(45) Date of Patent: Sep. 8, 2026

(54) GAS CUTTING METHOD FOR CUTTING STEEL MATERIAL AND STEEL MATERIAL PRODUCING METHOD

(71) Applicant: JFE STEEL CORPORATION, Tokyo (JP)

(72) Inventors: Yuta Tokumoto, Tokyo (JP); Koji Yamashita, Tokyo (JP); Toshiki Komori, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 847 days.

(21) Appl. No.: 17/910,169

(22) PCT Filed: Jan. 13, 2021

(86) PCT No.: PCT/JP2021/000922
§ 371 (c)(1),
(2) Date: Sep. 8, 2022

(87) PCT Pub. No.: WO2021/181860
PCT Pub. Date: Sep. 16, 2021

(65) Prior Publication Data

US 2023/0086693 A1 Mar. 23, 2023

(30) Foreign Application Priority Data

Mar. 9, 2020 (JP) ................................ 2020-039474

(51) Int. Cl.
*B23K 7/00* (2006.01)
*B21B 1/08* (2006.01)
(Continued)

(52) U.S. Cl.
CPC ................ *B23K 7/001* (2013.01); *B21B 1/08* (2013.01); *B23K 7/008* (2013.01); *B23K 37/06* (2013.01);
(Continued)

(58) Field of Classification Search
CPC ........ B23K 7/001; B23K 7/008; B23K 37/06; B23K 37/0229; B23K 2103/04; B23K 7/00; B21B 1/08
See application file for complete search history.

(56) References Cited

U.S. PATENT DOCUMENTS 4,318,439 A 3/1982 Hiroshima et al.
5,470,047 A 11/1995 Shin et al.
(Continued)

FOREIGN PATENT DOCUMENTS

CN 1228156 A 9/1999
DE 1 288 100 B 1/1969
(Continued)

OTHER PUBLICATIONS

JP-H05329636-A, machine translation (Year: 1993).*
(Continued)

*Primary Examiner* — John A Hevey
(74) *Attorney, Agent, or Firm* — Oliff PLC

(57) ABSTRACT

A gas cutting method for cutting a steel material and a steel material producing method including arranging one steel material and another steel material in proximity, setting a preheating region on the one steel material in such a way that a preheating flame applied thereto does not reach the other steel material, preheating the one steel material by applying the preheating flame to the preheating region, and gas-cutting the one steel material by moving a cutting oxygen from the preheating region across a boundary between the one steel material and the other steel material until the cutting oxygen enters the other steel material. The preheating region may be set in such a way that an outer edge of the preheating flame is at least 2 mm away from the other steel material.

20 Claims, 4 Drawing Sheets

(51) Int. Cl.
*B23K 37/02* (2006.01)
*B23K 37/06* (2006.01)
*B23K 103/04* (2006.01)

(52) U.S. Cl.
CPC ...... *B23K 37/0229* (2013.01); *B23K 2103/04* (2018.08)

(56) References Cited

U.S. PATENT DOCUMENTS

2003/0168786 A1* 9/2003 Pasulka .............. B23K 37/0258 266/58
2021/0379699 A1* 12/2021 Sepp .................... B23K 26/352

FOREIGN PATENT DOCUMENTS

| | | | | |
|---|---|---|---|---|
| JP | S4831159 | A | | 4/1973 |
| JP | S49-84940 | A | | 8/1974 |
| JP | S58132366 | A | | 8/1983 |
| JP | S58196101 | A | * | 11/1983 |
| JP | H05329636 | A | * | 12/1993 |
| JP | H07-244018 | A | | 9/1995 |
| JP | 2009-248158 | A | | 10/2009 |
| JP | 2018-34191 | A | | 3/2018 |
| KR | 2012-0025063 | A | | 3/2012 |
| WO | 98/06994 | A1 | | 2/1998 |

OTHER PUBLICATIONS

JP-H05329636-A, machine translation. (Year: 1983).*
Apr. 30, 2024 Office Action issued in Chinese Patent Application No. 202180019570.3.
Jul. 7, 2023 Extended European Search Report issued in European Patent Application No. 21767797.0.
Apr. 6, 2021 International Search Report issued in International Patent Application No. PCT/JP2021/000922.
Jul. 19, 2022 Office Action issued in Japanese Patent Application 2021-524426.
Oct. 28, 2023 Office Action issued in Chinese Patent Application No. 202180019570.3.
Sep. 30, 2024 Office Action issued in Korean Patent Application No. 2022-7030408.
Jan. 22, 2024 Office Action issued in Korean Patent Application No. 2022-7030408.

* cited by examiner (a)

(b)

GAS CUTTING METHOD FOR CUTTING STEEL MATERIAL AND STEEL MATERIAL PRODUCING METHOD

TECHNICAL FIELD

This application relates to a gas cutting method for cutting a steel material and a steel material producing method using the gas cutting method.

BACKGROUND

Gas-cutting has been widely used as a method for cutting a steel material. Gas-cutting first involves preheating a cutting start point to as high as the ignition temperature or above, and then spraying a high-purity high-pressure cutting oxygen onto the cutting start point to burn the steel material. Slag produced by combustion of steel has a lower melting point than steel. Therefore, the slag is easily melted by the preheating, and blown away and removed by the cutting oxygen. By moving the position of spraying the cutting oxygen in this state, heat generated by combustion of steel serves as a heat source to allow the reaction to continue, so that the steel material is cut to form a groove.

Before a bloom is rolled to produce a steel material, four sides of an end surface of the bloom are chamfered by gas-cutting into a pyramid shape, for example, for the purposes of ensuring proper biting during rolling.

For example, Patent Literature 1 discloses a method in which a steel material or a bloom is gas-cut at an angle in various directions. In a conventional gas cutting method for cutting a steel material, such as that disclosed in Patent Literature 1, a cutting start point needs to be preheated to at least the ignition temperature, as described above, for each direction of gas-cutting of the steel material.

CITATION LIST

Patent Literature

PTL 1: Japanese Unexamined Patent Application Publication No. 2009-248158

SUMMARY

Technical Problem

In the production site for producing steel materials, such as those described above, the steel materials are generally arranged in proximity, with no space therebetween, due to, for example, space constraints in the factory building. Accordingly, if four sides of an end surface of each steel material are subjected to gas-cutting in this state, a high-temperature preheating flame for preheating the cutting start point of the steel material to be cut may reach and damage an adjacent steel material. To prevent this, it has been necessary to manually pull apart the adjacent steel materials, for example, with a bar before gas-cutting the four sides of the end surface of the steel material.

Also, when a bloom is gas-cut before being rolled, the direction of applying the preheating flame or cutting oxygen is limited, for example, from the viewpoint of workability. Therefore, to gas-cut the four sides (or upper, lower, right, and left sides) of an end surface of the bloom, the bloom needs to be axially rotated to change its orientation. Thus, before rolling the bloom, it has taken much trouble to chamfer the four sides of the end surface of the bloom to form a pyramid shape through gas-cutting.

The disclosed embodiments have been made in view of the circumstances described above. An object of the disclosed embodiments is to provide a gas cutting method for cutting a steel material in which, of steel materials arranged in proximity, with no space therebetween, a steel material to be cut can be efficiently cut without damaging another steel material adjacent thereto and a steel material producing method using the gas cutting method.

Solution to Problem

To solve the problems described above, a gas cutting method for cutting a steel material and a steel material producing method according to the disclosed embodiments have the following features.

[1] A gas cutting method for cutting a steel material includes arranging one steel material and another steel material in proximity, preheating the one steel material by applying a preheating flame to a preheating region of the one steel material, the preheating region being separate from the other steel material; and gas-cutting the one steel material by moving a cutting oxygen from the preheating region, without stopping the cutting oxygen at a boundary between the one steel material and the other steel material, until the cutting oxygen enters the other steel material.

The term "steel material" refers to a steel processed into a predetermined shape by any of various techniques, such as rolling, forging, drawing, and casting, and includes a steel ingot and a bloom obtained by casting or continuous casting of molten steel in the mold.

The term "in proximity" means that the space between the one steel material and the other steel material is 3 mm or less in size.

The term "preheating region" refers to a region of a steel material heated by a preheating flame to at least 900° C.

[2] In the gas cutting method for cutting a steel material according to [1], the preheating region is set to a position at least 2 mm away from the other steel material.

The "preheating region is set to a position at least 2 mm away from the other steel material" means that an outer edge of a region of the steel material heated by a preheating flame to at least 900° C. is set to a position at least 2 mm away from the other steel material.

[3] In the gas cutting method for cutting a steel material according to [1] or [2], an end portion of the one steel material is cut at a bevel by the gas-cutting.

The term "cut at a bevel" (or bevel cutting) refers to cutting performed in such a way that the cut surface has an oblique (or bevel) angle with respect to the steel material.

[4] In the gas cutting method for cutting a steel material according to any one of [1] to [3], a robot performs the preheating with the preheating flame and the gas-cutting with the cutting oxygen.

[5] The gas cutting method for cutting a steel material according to any one of [1] to [4] includes a process in which a first steel material, a second steel material, and a third steel material are arranged, as the one steel material and the other steel material, to be parallel to each other in proximity, with the first steel material interposed between the second steel material and the third steel material; a first chamfering process in which the first steel material is preheated by applying a preheating flame to a first preheating region on an upper side of an end surface of the first steel material, the first preheating region being separate from the second steel material and the third steel material, and a part of the end surface adjacent to the second steel material is gas-cut in such a way as to be chamfered by moving from the first preheating region a downwardly ejected cutting oxygen along an upper surface of the first steel material, without stopping the cutting oxygen at a boundary with the second steel material, until the cutting oxygen enters an upper surface of the second steel material; a second chamfering process in which the first steel material is preheated by applying a preheating flame to a second preheating region on the upper side of the end surface of the first steel material or on an upper side of a cut surface formed by the first chamfering process, the second preheating region being separate from the second steel material and the third steel material, and a part of the end surface adjacent to the third steel material is gas-cut in such a way as to be chamfered by moving from the second preheating region a downwardly ejected cutting oxygen along the upper surface of the first steel material, without stopping the cutting oxygen at a boundary with the third steel material, until the cutting oxygen enters an upper surface of the third steel material; a third chamfering process in which the first steel material is preheated by applying a preheating flame to a third preheating region on the upper side of the cut surface formed by the first or second chamfering process, the third preheating region being separate from the second steel material and the third steel material, and an upper part of the end surface is gas-cut in such a way as to be chamfered by horizontally moving a cutting oxygen from the third preheating region in a steel material width direction, the cutting oxygen being ejected diagonally downward toward a front as viewed from the end surface side; and a fourth chamfering process in which the first steel material is preheated by applying a preheating flame to a fourth preheating region on a lower side of the cut surface formed by the first or second chamfering process, the fourth preheating region being separate from the second steel material and the third steel material, and a lower part of the end surface is gas-cut in such a way as to be chamfered by horizontally moving a cutting oxygen from the fourth preheating region in the steel material width direction, the cutting oxygen being ejected diagonally downward toward a back as viewed from the end surface side.

[6] In the gas cutting method for cutting a steel material according to [5], the first to fourth chamfering processes are performed without changing orientations of the first to third steel materials.

[7] A steel material producing method includes rolling a bloom, the bloom being the first steel material gas-cut by the gas cutting method for cutting a steel material according to [5] or [6] in such a way that the part of the end surface adjacent to the second steel material, the part of the end surface adjacent to the third steel material, and the upper part and the lower part of the end surface are chamfered, and the bloom is rolled from the end surface side.

Advantageous Effects

In the gas cutting method for cutting a steel material according to the disclosed embodiments, a preheating region of one steel material to be cut is set at a position separate from another steel material not to be cut. Since the one steel material is preheated by applying a preheating flame to the preheating region, the other steel material is prevented from being damaged by a high-temperature preheating flame.

The cutting oxygen is moved across the boundary between the one steel material and the other steel material without being stopped, until the cutting oxygen enters the other steel material. Thus, although the one steel material and the other steel material are in proximity, a chain reaction in which application of cutting oxygen induces combustion of steel, the combustion induces heat generation, and the heat generation induces melting and removal of slag, is stopped at the boundary and the gas-cutting does not advance to the other steel material.

Also, the cutting oxygen is moved across the boundary between the one steel material and the other steel material without being stopped, until the cutting oxygen enters the other steel material. Thus, heat generation accompanying the combustion of steel in the one steel material does not continue for a long time at the boundary. Since the temperature of heat generated by the combustion of steel is lower than the preheating temperature of the preheating flame, the other steel material is prevented from being damaged at the boundary by the heat generated by application of the cutting oxygen.

DETAILED DESCRIPTION

Embodiments of a gas cutting method for cutting a steel material and a steel material producing method will now be described with reference to the drawings.

Figure 1:
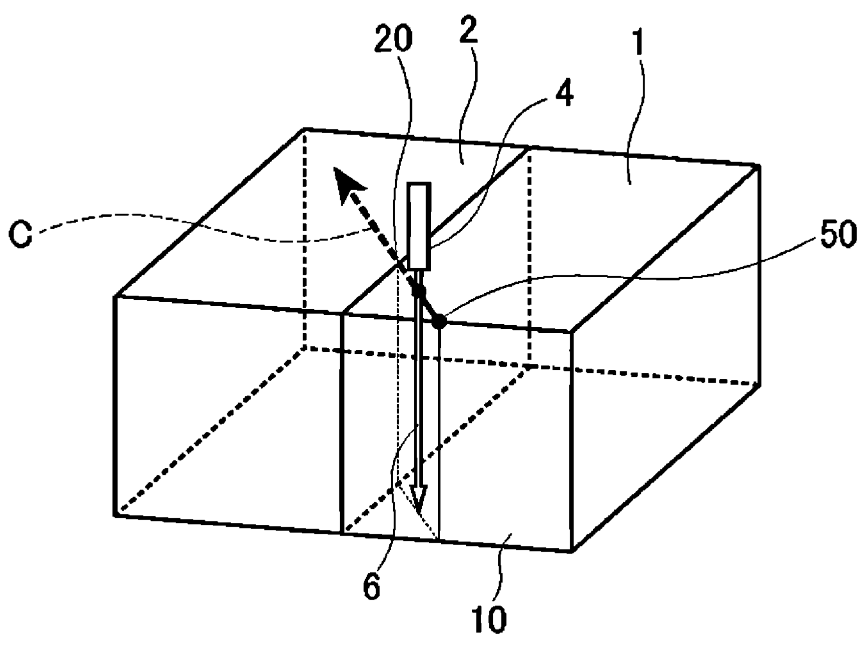
FIG. 1 is a perspective view schematically illustrating a position of a preheating region and a travel path of cutting oxygen in an example of a gas cutting method according to the disclosed embodiments.

With reference to FIG. 1, a first embodiment will be described which has a basic configuration of a gas cutting method for cutting a steel material according to the disclosed embodiments.

In the gas cutting method for cutting a steel material according to the first embodiment, one steel material 1 and another steel material 2, which are substantially in the shape of a rectangular parallelepiped, are first arranged in contact, with no space therebetween, as illustrated in FIG. 1.

Next, a preheating region 50 is set at a center of the upper side of an end surface 10 of the one steel material 1 not in contact with the other steel material 2, that is, at a position separate from the other steel material 2. The one steel material 1 is then preheated by applying, to the preheating region 50, a preheating flame (not shown) ejected from a cutting torch 4. The preheating region 50 refers to a region where the steel material is to be heated by the preheating flame to at least 900° C. The preheating region 50 is set to a position at least 2 mm away from the other steel material 2.

Next, a high-purity high-pressure cutting oxygen 6 is ejected downward from the cutting torch 4 and applied to the preheating region 50 to allow a gas cutting reaction zone to extend from the upper side to the lower side of the one steel material 1. With this state maintained, the cutting torch 4 is moved from the preheating region 50 in a cutting line C (see FIG. 1) along the upper surface of the one steel material 1 toward a boundary 20 with the other steel material 2 to gas-cut the one steel material 1. The cutting torch 4 is moved across the boundary 20 between the one steel material 1 and the other steel material 2 without being stopped, until the cutting torch 4 enters the upper surface of the other steel material 2. Thus, although the one steel material 1 and the other steel material 2 are in contact, with no space therebetween, a chain reaction, or gas-cutting, in which application of cutting oxygen induces combustion of steel, the combustion induces heat generation, and the heat generation induces melting and removal of slag, is stopped at the boundary 20 between the one steel material 1 and the other steel material 2 and does not advance to the other steel material 2. The one steel material 1 is thus cut at a bevel by gas-cutting in such a way that a part of the end surface 10 of the one steel material 1 adjacent to the other steel material 2 is chamfered.

Next, with reference to FIG. 2 to FIG. 6, a second embodiment of the gas cutting method for cutting a steel material according to the disclosed embodiments and an embodiment of a steel material producing method using the gas cutting method will be described.

Figure 2:
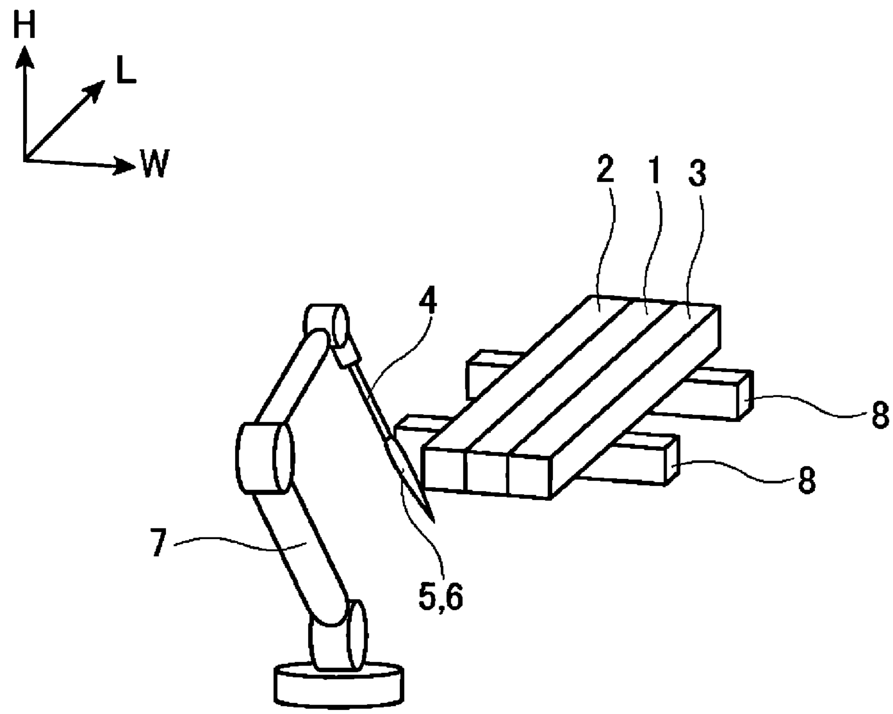
FIG. 2 is a perspective view schematically illustrating how a robot performs preheating with preheating flame and gas cutting with cutting oxygen in the other example of the gas cutting method according to the disclosed embodiments.

In the gas cutting method for cutting a steel material according to the second embodiment, as illustrated in FIG. 2, a robot 7 is configured to start and stop the ejection of the preheating flame 5 and the cutting oxygen 6 from the cutting torch 4, three-dimensionally move the cutting torch 4, and change the angle of the cutting torch 4.

Figure 3:
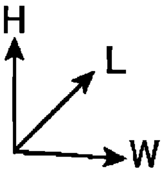
FIG. 3 is a perspective view schematically illustrating the position of a first preheating region and the travel path of cutting oxygen in a first chamfering process in the other example of the gas cutting method according to the disclosed embodiments.
Figure 3:
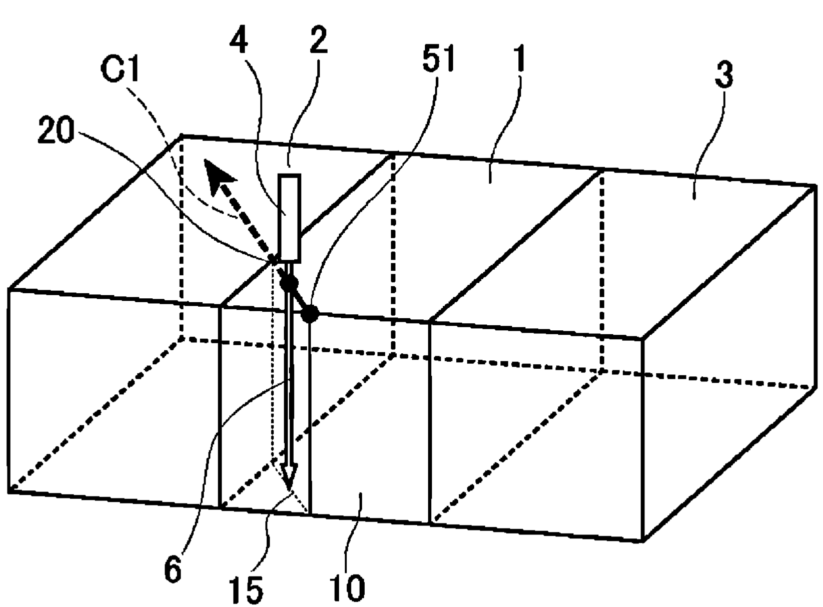

First, as illustrated in FIG. 2 and FIG. 3, a first steel material (one steel material) 1, a second steel material (another steel material) 2, and a third steel material (another steel material) 3, which are rectangular in cross section, are arranged in contact, with no space therebetween, on bases 8 in such a way as to extend in parallel along a length direction L of the steel materials 1 to 3, with the first steel material 1 interposed between the second steel material 2 and the third steel material 3.

Then, with the first to third steel materials 1 to 3 arranged on the bases 8 as described above, the robot 7 controls the behavior of the cutting torch 4 without changing the orientations of the first to third steel materials 1 to 3 to perform first to fourth chamfering processes (described below).

First, the first chamfering process illustrated in FIG. 3 is performed. A first preheating region (preheating region) 51 is first set at a center of the upper side of the end surface 10 of the first steel material 1 in the length direction L, that is, at a position on the upper side of the end surface 10 of the first steel material 1 and separate from both the second steel material 2 and the third steel material 3. The first steel material 1 is then preheated by applying, to the first preheating region 51, a preheating flame (not shown in FIG. 3) ejected from the cutting torch 4. The first preheating region 51 is at least 2 mm away from both the second steel material 2 and the third steel material 3.

Next, the high-purity high-pressure cutting oxygen 6 is ejected downward from the cutting torch 4 and applied to the first preheating region 51 to allow a gas-cutting reaction zone to extend from the upper side to the lower side of the first steel material 1. With this state maintained, the cutting torch 4 is moved from the first preheating region 51 in a cutting line C1 (see FIG. 3) along the upper surface of the first steel material 1 toward the boundary 20 with the second steel material 2 to gas-cut the first steel material 1. The cutting torch 4 is moved across the boundary 20 between the first steel material 1 and the second steel material 2 without being stopped, until the cutting torch 4 enters the upper surface of the second steel material 2. Thus, although the first steel material 1 and the second steel material 2 are in contact, with no space therebetween, a chain reaction, or gas-cutting, in which application of cutting oxygen induces combustion of steel, the combustion induces heat generation, and the heat generation induces melting and removal of slag, is stopped at the boundary 20 between the first steel material 1 and the second steel material 2 and does not advance to the second steel material 2. The first steel material 1 is thus cut at a bevel by gas-cutting in such a way that a part of the end surface 10 of the first steel material 1 adjacent to the second steel material 2 is chamfered, and the cut piece drops away.

Figure 4:
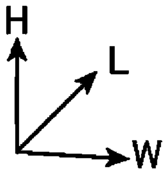
FIG. 4 is a perspective view schematically illustrating the position of a second preheating region and the travel path of cutting oxygen in a second chamfering process in the other example of the gas cutting method according to the disclosed embodiments.
Figure 4:
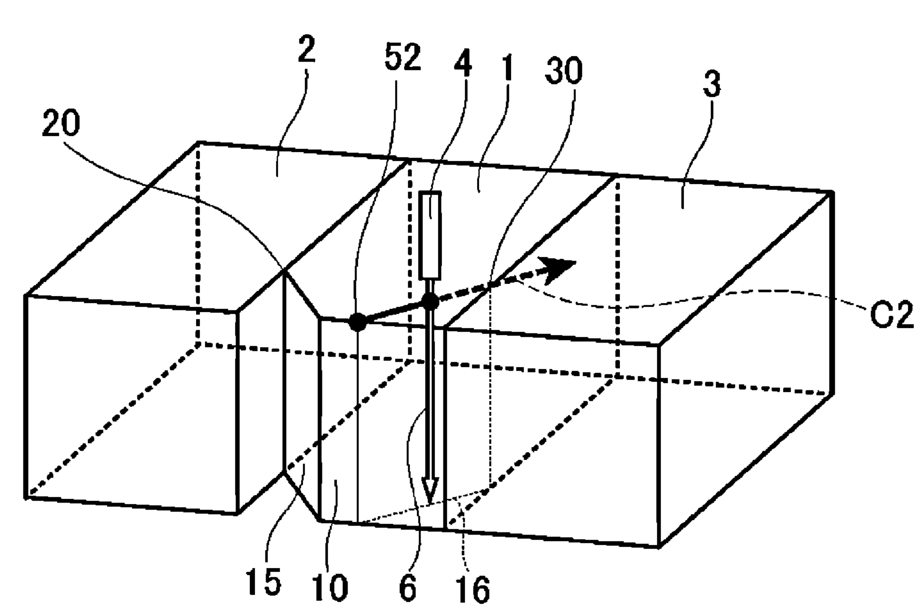

Next, the second chamfering process illustrated in FIG. 4 is performed. A second preheating region (preheating region) 52 is first set at a position on the upper side of the end surface 10 of the first steel material 1 and close to a cut surface 15 formed by the first chamfering process, that is, at a position separate from both the second steel material 2 and the third steel material 3. The first steel material 1 is then preheated by applying, to the second preheating region 52, a preheating flame (not shown in FIG. 4) ejected from the cutting torch 4. Instead of being set at the position described above, the second preheating region 52 may be set at a position on the upper side of the cut surface 15 formed by the first chamfering process and close to the end surface 10 of the first steel material 1, that is, at a position separate from both the second steel material 2 and the third steel material 3. Like the first preheating region 51, the second preheating region 52 is at least 2 mm away from both the second steel material 2 and the third steel material 3.

Next, the high-purity high-pressure cutting oxygen 6 is ejected downward from the cutting torch 4 and applied to the second preheating region 52 to allow a gas-cutting reaction zone to extend from the upper side to the lower side of the first steel material 1. With this state maintained, the cutting torch 4 is moved from the second preheating region 52 in a cutting line C2 (see FIG. 4) along the upper surface of the first steel material 1 toward a boundary 30 with the third steel material 3 to gas-cut the first steel material 1. The cutting torch 4 is moved across the boundary 30 between the first steel material 1 and the third steel material 3 without being stopped, until the cutting torch 4 enters the upper surface of the third steel material 3. Thus, although the first steel material 1 and the third steel material 3 are in contact, with no space therebetween, a chain reaction, or gas-cutting, in which application of cutting oxygen induces combustion of steel, the combustion induces heat generation, and the heat generation induces melting and removal of slag, is stopped at the boundary 30 between the first steel material 1 and the third steel material 3 and does not advance to the third steel material 3. The first steel material 1 is thus cut at a bevel by gas-cutting in such a way that a part of the end surface 10 of the first steel material 1 adjacent to the third steel material 3 is chamfered, and the cut piece drops away.

The cut surface 15 formed by the first chamfering process and a cut surface 16 formed by the second chamfering process are preferably symmetrical right and left.

Figure 5:
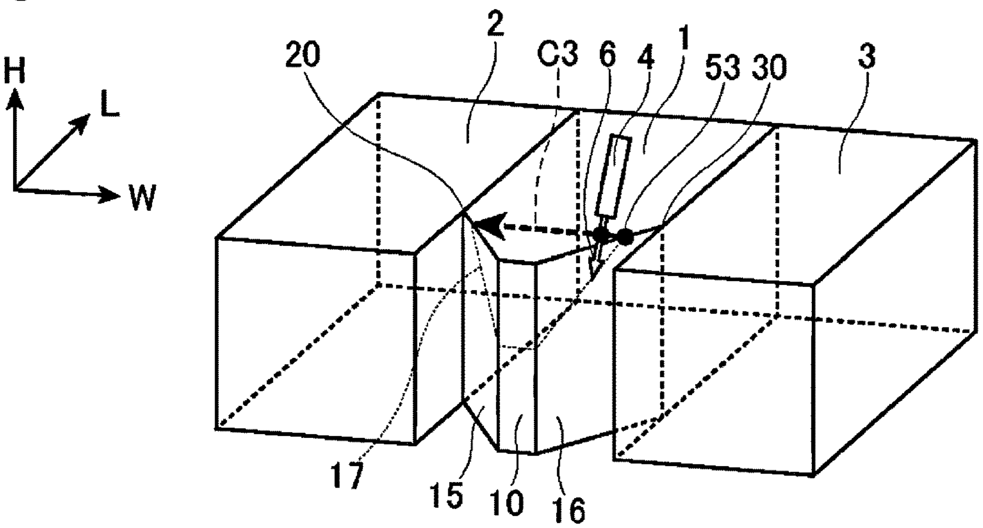
FIG. 5 is a perspective view schematically illustrating the position of a third preheating region and the travel path of cutting oxygen in a third chamfering process in the other example of the gas cutting method according to the disclosed embodiments.

Next, the third chamfering process illustrated in FIG. 5 is performed. A third preheating region (preheating region) 53 is first set at a position on the upper side of the cut surface 16 formed by the second chamfering process and separate from, but close to, the third steel material 3. The first steel material 1 is then preheated by applying, to the third preheating region 53, a preheating flame (not shown in FIG. 5) ejected diagonally downward from the cutting torch 4 toward the front. Like the first preheating region 51 and the second preheating region 52, the third preheating region 53 is at least 2 mm away from both the second steel material 2 and the third steel material 3.

Next, the high-purity high-pressure cutting oxygen 6 is ejected diagonally downward from the cutting torch 4 toward the front, as viewed from the side of the end surface 10 of the first steel material 1, and applied to the third preheating region 53 to allow a gas-cutting reaction zone to extend from the upper surface to the end surface 10 of the first steel material 1. With this state maintained, the cutting torch 4 is moved from the third preheating region 53 in a cutting line C3 (see FIG. 5) along the upper surface of the first steel material 1 in a steel material width direction W to gas-cut the first steel material 1. The first steel material 1 is thus cut at a bevel by gas-cutting in such a way that an upper part of the end surface 10 of the first steel material 1 is chamfered, and the cut piece slips down a cut surface 17.

In the third chamfering process, as illustrated in FIG. 5, if the end point of gas-cutting is on the cut surface 15 formed by the first chamfering process, the end point of gas-cutting is separate from the second steel material 2. Therefore, unlike in the cases of the first chamfering process and the second chamfering process, the cutting torch 4 may be stopped at the end point of gas-cutting. Alternatively, if the end point of gas-cutting is in contact with the second steel material 2, and is not on the cut surface 15 formed by the first chamfering process, the cutting torch 4 is moved across the boundary between the first steel material 1 and the second steel material 2 without being stopped, until the cutting torch 4 enters the upper surface of the second steel material 2, as in the cases of the first chamfering process and the second chamfering process. Thus, although the first steel material 1 and the second steel material 2 are in contact, with no space therebetween, a chain reaction, or gas-cutting, in which application of cutting oxygen induces combustion of steel, the combustion induces heat generation, and the heat generation induces melting and removal of slag, is stopped at the boundary between the first steel material 1 and the second steel material 2 and does not advance to the second steel material 2.

The third preheating region 53 may be set at a position on the upper side of the cut surface 15 formed by the first chamfering process and separate from, but close to, the second steel material 2. In this case, the cutting torch 4 is moved in the steel material width direction W from the third preheating region 53, in the right and left direction opposite that described above, to gas-cut an upper part of the end surface 10 of the first steel material 1.

Figure 6:
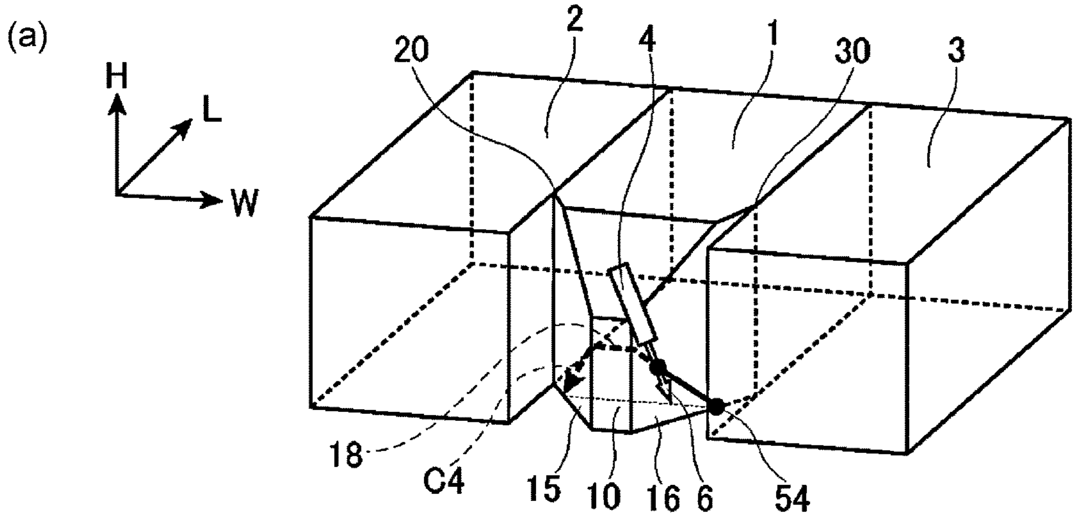
FIG. 6(*a*) and FIG. 6(*b*) are a perspective view and a top view, respectively, schematically illustrating the position of a fourth preheating region and the travel path of cutting oxygen in a fourth chamfering process in the other example of the gas cutting method according to the disclosed embodiments.
Figure 6:
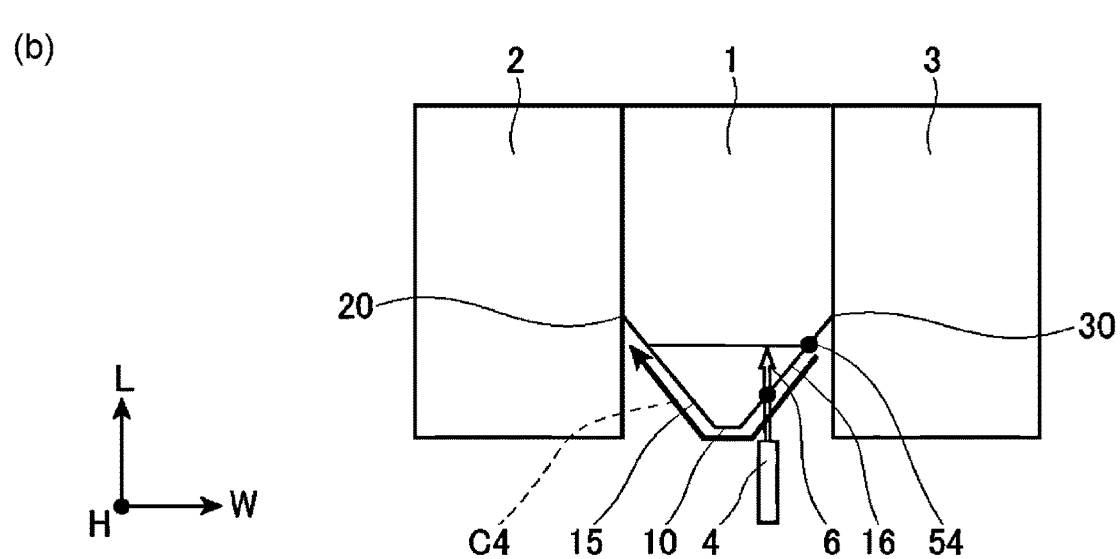

Next, the fourth chamfering process illustrated in FIG. 6(*a*) and FIG. 6(*b*) is performed. A fourth preheating region (preheating region) 54 is first set at a position on the lower side of the cut surface 16 formed by the second chamfering process and separate from, but close to, the third steel material 3. The first steel material 1 is then preheated by applying, to the fourth preheating region 54, a preheating flame (not shown in FIG. 6) ejected diagonally downward from the cutting torch 4 toward the back, parallel to the right and left sides of the first to third steel materials 1 to 3. Like the first preheating region 51, the second preheating region 52, and the third preheating region 53, the fourth preheating region 54 is at least 2 mm away from both the second steel material 2 and the third steel material 3.

Next, the high-purity high-pressure cutting oxygen 6 is ejected diagonally downward from the cutting torch 4 toward the back, as viewed from the side of the end surface 10 of the first steel material 1, and applied to the fourth preheating region 54 to allow a gas-cutting reaction zone to extend from the end surface 10 to the lower surface of the first steel material 1. With this state and the orientation of the cutting torch 4 maintained, the cutting torch 4 is moved from the fourth preheating region 54 in the steel material width direction W along a cutting line C4 (see FIG. 6(*a*) and FIG. 6(*b*)) to gas-cut the first steel material 1. The cutting line C4 is set by the cross lines of a cut surface 18 to be formed by the fourth chamfering process, the end surface 10 of the first steel material 1, and the cut surfaces 15 and 16 formed by the first chamfering process and the second chamfering process. The first steel material 1 is thus cut at a bevel by gas-cutting in such a way that a lower part of the end surface 10 of the first steel material 1 is chamfered, and the cut piece drops away.

Figure 7:
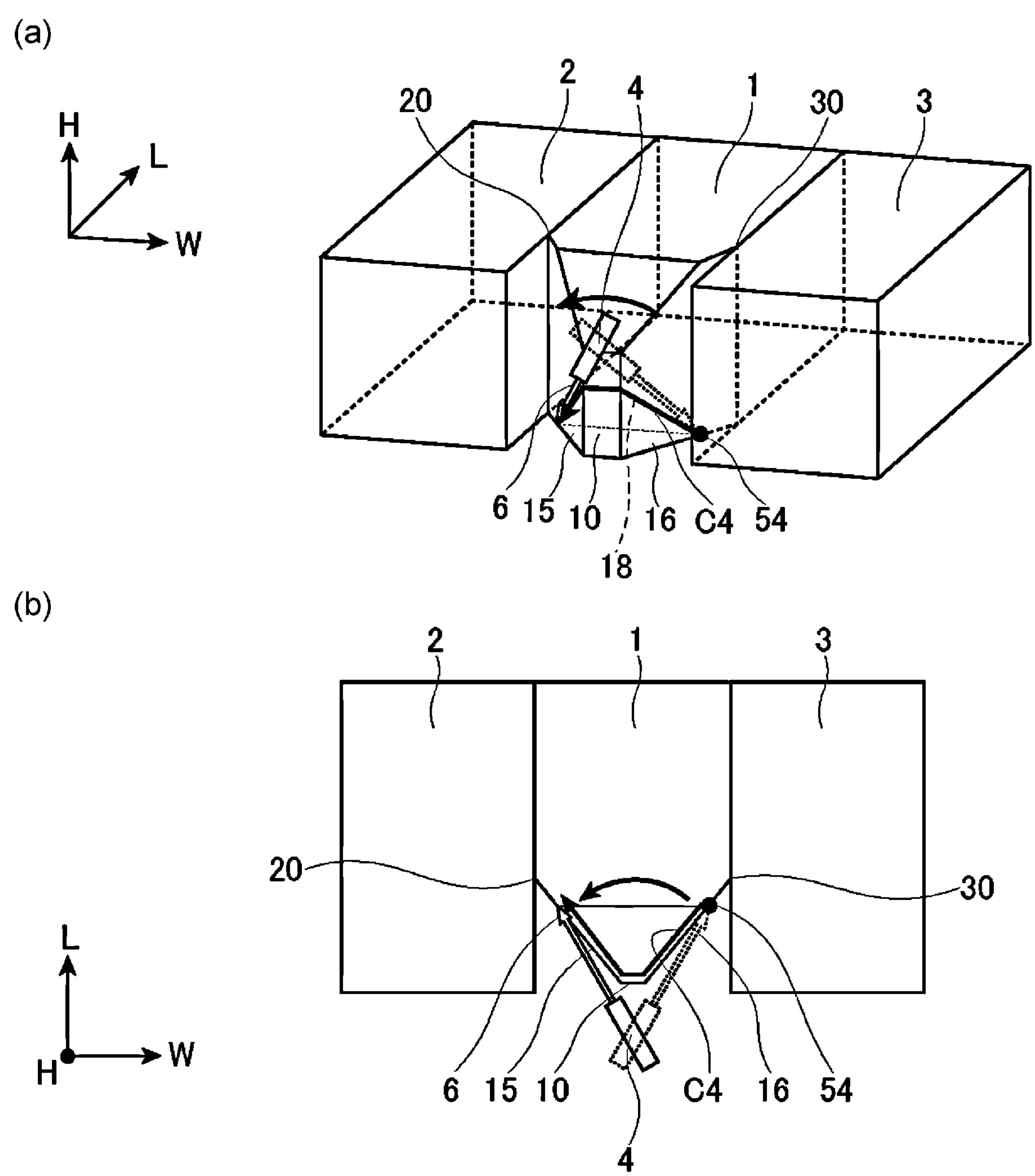
FIG. 7(*a*) and FIG. 7(*b*) are a perspective view and a top view, respectively, illustrating a modification of the fourth chamfering process in the other example of the gas cutting method according to the disclosed embodiments.

Alternatively, the fourth chamfering process is performed in the manner illustrated in FIG. 7(*a*) and FIG. 7(*b*), instead of that in FIG. 6(*a*) and FIG. 6(*b*). That is, from the cutting torch 4 positioned near the center of the end surface 10 of the first steel material 1, a preheating flame (not shown in FIG. 7) is ejected toward the fourth preheating region 54 situated diagonally downward at the back, at an angle of inclination with respect to the right and left sides of the first to third steel materials 1 to 3. The first steel material 1 is thus preheated by applying the ejected preheating flame to the fourth preheating region 54.

Next, from the cutting torch 4 positioned near the center of the end surface 10 of the first steel material 1, the high-purity high-pressure cutting oxygen 6 is ejected diagonally downward toward the back, and applied to the fourth preheating region 54 to allow a gas-cutting reaction zone to extend from the end surface 10 to the lower surface of the first steel material 1. With this state maintained, the cutting torch 4 is slightly moved in the steel material width direction W while being changed in orientation, as illustrated in FIG. 7(*a*) and FIG. 7(*b*), from the state indicated by a broken line to the state indicated by a solid line. Thus, the first steel material 1 is gas-cut by moving the position at which the cutting oxygen 6 is applied to the first steel material 1, from the fourth preheating region 54 along the cutting line C4.

In the fourth chamfering process, as illustrated in FIG. 6(*a*) and FIG. 6(*b*) or in FIG. 7(*a*) and FIG. 7(*b*), if the end point of gas-cutting is on the cut surface 15 formed by the first chamfering process, the end point of gas-cutting is separate from the second steel material 2. Therefore, unlike in the cases of the first chamfering process and the second chamfering process, the cutting torch 4 may be stopped at the end point of gas-cutting. Alternatively, if the end point of gas-cutting is in contact with the second steel material 2, and is not on the cut surface 15 formed by the first chamfering process, the cutting torch 4 is moved across the boundary between the first steel material 1 and the second steel material 2 without being stopped, until the cutting torch 4 enters the upper surface of the second steel material 2, as in the cases of the first chamfering process and the second chamfering process. Thus, although the first steel material 1 and the second steel material 2 are in contact, with no space therebetween, a chain reaction, or gas-cutting, in which application of cutting oxygen induces combustion of steel, the combustion induces heat generation, and the heat generation induces melting and removal of slag, is stopped at the boundary between the first steel material 1 and the second steel material 2 and does not advance to the second steel material 2.

The fourth preheating region 54 may be set at a position on the lower side of the cut surface 15 formed by the first chamfering process and separate from, but close to, the second steel material 2. In this case, the cutting torch 4 is moved in the steel material width direction W from the fourth preheating region 54, in the right and left direction opposite that described above, to gas-cut a lower part of the end surface 10 of the first steel material 1.

The cut surface 17 formed by the third chamfering process and the cut surface 18 formed by the fourth chamfering process are preferably symmetrical up and down.

Then, a steel material producing method of the present embodiment uses, as a bloom, the first steel material 1 that is gas-cut by the gas cutting method for cutting a steel material, described above, in such a way that the upper, lower, right, and left sides of the end surface 10 are chamfered. The bloom (first steel material) 1 is rolled from the end surface 10 side.

In the gas cutting method for cutting a steel material according to the embodiments, the preheating regions (first to fourth preheating regions) 50 to 54 of one steel material (first steel material) 1 to be cut are each set at a position separate from other steel materials (second and third steel materials) 2 and 3 not to be cut. This prevents the other steel materials (second and third steel materials) 2 and 3 from being damaged by a high-temperature preheating flame. In particular, when the preheating regions (first to fourth preheating regions) 50 to 54 are at least 2 mm away from the other steel materials (second and third steel materials) 2 and 3, the other steel materials (second and third steel materials) 2 and 3 can be reliably prevented from being damaged by the preheating flame.

Also, in the gas cutting method for cutting a steel material according to the embodiments, the cutting oxygen is moved across the boundaries 20 and 30 between the one steel material (first steel material) 1 and the other steel materials (second and third steel materials) 2 and 3 without being stopped, until the cutting oxygen enters the other steel materials (second and third steel materials) 2 and 3. Thus, although the one steel material (first steel material) 1 and the other steel materials (second and third steel materials) 2 and 3 are in contact, with no space therebetween, a chain reaction in which application of cutting oxygen induces combustion of steel, the combustion induces heat generation, and the heat generation induces melting and removal of slag, is stopped at the boundaries 20 and 30 and the gas-cutting does not advance to the other steel materials (second and third steel materials) 2 and 3.

Also, in the gas-cutting method for cutting a steel material according to the embodiments, the cutting oxygen is moved across the boundaries 20 and 30 between the one steel material (first steel material) 1 and the other steel materials (second and third steel materials) 2 and 3 without being stopped, until the cutting oxygen enters the other steel materials (second and third steel materials) 2 and 3. Thus, heat generation accompanying the combustion of steel in the one steel material (first steel material) 1 does not continue for a long time at the boundaries 20 and 30. Since the temperature of heat generated by the combustion of steel is lower than the preheating temperature of the preheating flame, the other steel materials (second and third steel materials) 2 and 3 are prevented from being damaged at the boundaries 20 and 30 by the heat generated by application of the cutting oxygen.

In the method for cutting a steel material according to the second embodiment, the cutting oxygen is horizontally moved from the third preheating region, or from the fourth preheating region, in the steel material width direction for gas-cutting the first steel material. The end point of gas-cutting is thus separate from the second steel material and the third steel material which are not to be cut. Therefore, the second steel material and the third steel material are prevented from being damaged by heat generated by combustion of steel.

The robot 7 is configured to start and stop the ejection of the preheating flame 5 and the cutting oxygen 6 from the cutting torch 4, three-dimensionally move the cutting torch 4, and change the angle of the cutting torch 4. This makes it possible to ensure very efficient and safe gas-cutting operation.

In the first to fourth chamfering processes, the first steel material 1 is preheated by applying the preheating flame to the upper side of the end surface 10 of the first steel material 1, or to the upper side or lower side of the cut surface 15 or 16 formed by the first or second chamfering process, and is gas-cut by using the cutting oxygen ejected downward, diagonally downward toward the front, or diagonally downward toward the back. Thus, the cutting torch 4 that ejects the preheating flame and the cutting oxygen is directed downward in a vertical plane parallel to the first to third steel materials 1 to 3. Thus, without axially rotating the first to third steel materials 1 to 3 to change their orientations, the cutting torch 4 is prevented from interfering with the steel materials. Therefore, without taking out the steel materials one by one, gas-cutting can be performed while the steel materials are arranged in contact, with no space therebetween. The cutting torch 4 operated by the robot 7 is thus prevented from interfering with the steel materials.

In the steel material producing method according to the embodiment, the first steel material 1 is gas-cut by the gas cutting method for cutting a steel material in such a way that a part of the end surface 10 adjacent to the second steel material 2, a part of the end surface 10 adjacent to the third steel material 3, and upper and lower parts of the end surface 10 are chamfered, and then the resulting first steel material 1 is rolled as a bloom from the end surface 10 side. This enables efficient processing of the end portion of the steel material 1 before rolling of the steel material, and significantly increases the efficiency of production of steel materials.

EXAMPLES

A comparative test was performed to verify the effect of the method for cutting a steel material according to the disclosed embodiments, in which a preheating region was set at a position separate from another steel material.

The gas cutting method for cutting a steel material according to the second embodiment was tested. In the third chamfering process illustrated in FIG. 5, the center of a preheating flame applied to the third preheating region 53 was set to five different positions, that is, 0 mm (Comparative Example 1), 1 mm (Comparative Example 2), 3 mm (Example 1), 4 mm (Example 2), and 5 mm (Example 3) from the third steel material 3 in the steel material width direction W. The present comparative test was set in such a way that the radius of the preheating region, or the distance from the center of the preheating flame to the outer edge of the region where the steel material was heated by the preheating flame to at least 900° C., was 2 mm.

After gas-cutting in the third chamfering process, a visual check was performed for the five examples described above to see whether the third steel material 3 was damaged by the preheating flame.

It was visually confirmed in Comparative Examples 1 and 2 that the third steel material 3 not far from the third preheating region 53 was damaged by the preheating flame. It was not confirmed in Examples 1 to 3 that the third steel material 3 far from the third preheating region 53 was damaged by the preheating flame. The test thus confirmed that by setting the preheating region at a position separate from the other steel material, it was possible to prevent the other steel material from being damaged by the preheating flame.

The invention claimed is:

1. A gas cutting method for cutting a steel material, the gas cutting method comprising:

arranging a first steel material with at least one second steel material in proximity, wherein a space between the first steel material and the at least one second steel material is 3 mm or less;

preheating the first steel material by applying a preheating flame to a preheating region of the first steel material, the preheating region being separate from the at least one second steel material; and gas-cutting the first steel material by moving a cutting torch ejecting high-pressure oxygen from the preheating region, without stopping the high-pressure oxygen at a boundary between the first steel material and the at least one second steel material, and stopping moving the high-pressure oxygen when the high-pressure oxygen enters the at least one second steel material, wherein the gas-cutting of the first steel material stops at the boundary between the first steel material and the at least one second steel material and does not advance to the at least one second steel material.

2. The gas cutting method for cutting a steel material according to claim 1, wherein the preheating region is set to a position at least 2 mm away from the at least one second steel material.

3. The gas cutting method for cutting a steel material according to claim 1, wherein an end portion of the first steel material is cut at a bevel by the gas-cutting.

4. The gas cutting method for cutting a steel material according to claim 1, wherein the preheating with the preheating flame and the gas-cutting with the high-pressure oxygen are performed by a robot.

5. The gas cutting method for cutting a steel material according to claim 1, wherein the at least one second steel material includes two second steel materials, and the first steel material and the two second steel materials are arranged in parallel to each other, with the first steel material interposed between the two second steel materials, and the gas cutting method further comprises:

a first chamfering process in which the first steel material is preheated by applying a preheating flame to a first preheating region on an upper side of an end surface of the first steel material, the first preheating region being separate from the two second steel materials, and a part of the end surface adjacent to a first one of the two second steel materials is gas-cut so as to be chamfered by moving from the first preheating region-a downwardly ejected high-pressure oxygen along an upper surface of the first steel material, without stopping the high-pressure oxygen at a boundary with the first one of the two second steel materials, until the high-pressure oxygen enters an upper surface of the first one of the two second steel materials, a second chamfering process in which the first steel material is preheated by applying a preheating flame to a second preheating region on the upper side of the end surface of the first steel material or on an upper side of a cut surface formed by the first chamfering process, the second preheating region being separate from the two second steel materials, and a part of the end surface adjacent to a second one of the two second steel materials is gas-cut so as to be chamfered by moving from the second preheating region-a downwardly ejected high-pressure oxygen along the upper surface of the first steel material, without stopping the high-pressure oxygen at a boundary with the second one of the two second steel materials, until the high-pressure oxygen enters an upper surface of the second one of the two second steel materials, a third chamfering process in which the first steel material is preheated by applying a preheating flame to a third preheating region on the upper side of the cut surface formed by the first or second chamfering process, the third preheating region being separate from the two second steel materials, and an upper part of the end surface is gas-cut so as to be chamfered by horizontally moving a high-pressure oxygen from the third preheating region in a steel material width direction, the high-pressure oxygen being ejected diagonally downward toward a front as viewed from the end surface side, and a fourth chamfering process in which the first steel material is preheated by applying a preheating flame to a fourth preheating region on a lower side of the cut surface formed by the first or second chamfering process, the fourth preheating region being separate from the two second steel materials, and a lower part of the end surface is gas-cut so as to be chamfered by horizontally moving a high-pressure oxygen from the fourth preheating region in the steel material width direction, the high-pressure oxygen being ejected diagonally downward toward a back as viewed from the end surface side.

6. The gas cutting method for cutting a steel material according to claim 5, wherein the first to fourth chamfering processes are performed without changing orientations of the first steel material and the two second steel materials.

7. A steel material producing method of rolling a bloom gas cut by the method of claim 5, further comprising chamfering the part of the end surface adjacent to the first one of the two second steel materials, the part of the end surface adjacent to the second one of the two second steel materials, the upper part and the lower part of the end surface and rolling the bloom from the end surface side.

8. The gas cutting method for cutting a steel material according to claim 2, wherein the at least one second steel material includes two second steel materials, and the first steel material and the two second steel materials are arranged in parallel to each other, with the first steel material interposed between the two second steel materials, and the gas cutting method further comprises:

a first chamfering process in which the first steel material is preheated by applying a preheating flame to a first preheating region on an upper side of an end surface of the first steel material, the first preheating region being separate from the two second steel materials, and a part of the end surface adjacent to a first one of the two second steel materials is gas-cut so as to be chamfered by moving from the first preheating region-a downwardly ejected high-pressure oxygen along an upper surface of the first steel material, without stopping the high-pressure oxygen at a boundary with the first one of the two second steel materials, until the high-pressure oxygen enters an upper surface of the first one of the two second steel materials, a second chamfering process in which the first steel material is preheated by applying a preheating flame to a second preheating region on the upper side of the end surface of the first steel material or on an upper side of a cut surface formed by the first chamfering process, the second preheating region being separate from the two second steel materials, and a part of the end surface adjacent to a second one of the two second steel materials is gas-cut so as to be chamfered by moving from the second preheating region downwardly ejected high-pressure oxygen along the upper surface of the first steel material, without stopping the high-pressure oxygen at a boundary with the second one of the two second steel materials, until the high-pressure oxygen enters an upper surface of the second one of the two second steel materials, a third chamfering process in which the first steel material is preheated by applying a preheating flame to a third preheating region on the upper side of the cut surface formed by the first or second chamfering process, the third preheating region being separate from the two second steel materials, and an upper part of the end surface is gas-cut so as to be chamfered by horizontally moving a high-pressure oxygen from the third preheating region in a steel material width direction, the high-pressure oxygen being ejected diagonally downward toward a front as viewed from the end surface side, and a fourth chamfering process in which the first steel material is preheated by applying a preheating flame to a fourth preheating region on a lower side of the cut surface formed by the first or second chamfering process, the fourth preheating region being separate from the two second steel materials, and a lower part of the end surface is gas-cut so as to be chamfered by horizontally moving a high-pressure oxygen from the fourth preheating region in the steel material width direction, the high-pressure oxygen being ejected diagonally downward toward a back as viewed from the end surface side.

9. The gas cutting method for cutting a steel material according to claim 3, wherein the at least one second steel material includes two second steel materials, and the first steel material and the two second steel materials are arranged in parallel to each other, with the first steel material interposed between the two second steel materials, and the gas cutting method further comprises:

a first chamfering process in which the first steel material is preheated by applying a preheating flame to a first preheating region on an upper side of an end surface of the first steel material, the first preheating region being separate from the two second steel materials, and a part of the end surface adjacent to a first one of the two second steel materials is gas-cut so as to be chamfered by moving from the first preheating region-a downwardly ejected high-pressure oxygen along an upper surface of the first steel material, without stopping the high-pressure oxygen at a boundary with the first one of the two second steel materials, until the high-pressure oxygen enters an upper surface of the first one of the two second steel materials, a second chamfering process in which the first steel material is preheated by applying a preheating flame to a second preheating region on the upper side of the end surface of the first steel material or on an upper side of a cut surface formed by the first chamfering process, the second preheating region being separate from the two second steel materials, and a part of the end surface adjacent to a second one of the two second steel materials is gas-cut so as to be chamfered by moving from the second preheating region-a downwardly ejected high-pressure oxygen along the upper surface of the first steel material, without stopping the high-pressure oxygen at a boundary with the second one of the two second steel materials, until the high-pressure oxygen enters an upper surface of the second one of the two second steel materials, a third chamfering process in which the first steel material is preheated by applying a preheating flame to a third preheating region on the upper side of the cut surface formed by the first or second chamfering process, the third preheating region being separate from the two second steel materials, and an upper part of the end surface is gas-cut so as to be chamfered by horizontally moving a high-pressure oxygen from the third preheating region in a steel material width direction, the high-pressure oxygen being ejected diagonally downward toward a front as viewed from the end surface side, and a fourth chamfering process in which the first steel material is preheated by applying a preheating flame to a fourth preheating region on a lower side of the cut surface formed by the first or second chamfering process, the fourth preheating region being separate from the two second steel materials, and a lower part of the end surface is gas-cut so as to be chamfered by horizontally moving a high-pressure oxygen from the fourth preheating region in the steel material width direction, the high-pressure oxygen being ejected diagonally downward toward a back as viewed from the end surface side.

10. The gas cutting method for cutting a steel material according to claim 4, wherein the at least one second steel material includes two second steel materials, and the first steel material and the two second steel materials are arranged in parallel to each other, with the first steel material interposed between the two second steel materials, and the gas cutting method further comprises:

a first chamfering process in which the first steel material is preheated by applying a preheating flame to a first preheating region on an upper side of an end surface of the first steel material, the first preheating region being separate from the two second steel materials, and a part of the end surface adjacent to a first one of the two second steel materials is gas-cut so as to be chamfered by moving from the first preheating region-a downwardly ejected high-pressure oxygen along an upper surface of the first steel material, without stopping the high-pressure oxygen at a boundary with the first one of the two second steel materials, until the high-pressure oxygen enters an upper surface of the first one of the two second steel materials, a second chamfering process in which the first steel material is preheated by applying a preheating flame to a second preheating region on the upper side of the end surface of the first steel material or on an upper side of a cut surface formed by the first chamfering process, the second preheating region being separate from the two second steel materials, and a part of the end surface adjacent to a second one of the two second steel materials is gas-cut so as to be chamfered by moving from the second preheating region-a downwardly ejected high-pressure oxygen along the upper surface of the first steel material, without stopping the high-pressure oxygen at a boundary with the second one of the two second steel materials, until the high-pressure oxygen enters an upper surface of the second one of the two second steel materials, a third chamfering process in which the first steel material is preheated by applying a preheating flame to a third preheating region on the upper side of the cut surface formed by the first or second chamfering process, the third preheating region being separate from the two second steel materials, and an upper part of the end surface is gas-cut so as to be chamfered by horizontally moving a high-pressure oxygen from the third preheating region in a steel material width direction, the high-pressure oxygen being ejected diagonally downward toward a front as viewed from the end surface side, and a fourth chamfering process in which the first steel material is preheated by applying a preheating flame to a fourth preheating region on a lower side of the cut surface formed by the first or second chamfering process, the fourth preheating region being separate from the two second steel materials, and a lower part of the end surface is gas-cut so as to be chamfered by horizontally moving a high-pressure oxygen from the fourth preheating region in the steel material width direction, the high-pressure oxygen being ejected diagonally downward toward a back as viewed from the end surface side.

11. The gas cutting method for cutting a steel material according to claim 8, wherein the first to fourth chamfering processes are performed without changing orientations of the first steel material and the two second steel materials.

12. The gas cutting method for cutting a steel material according to claim 9, wherein the first to fourth chamfering processes are performed without changing orientations of the first steel material and the two second steel materials.

13. The gas cutting method for cutting a steel material according to claim 10, wherein the first to fourth chamfering processes are performed without changing orientations of the first steel material and the two second steel materials.

14. A steel material producing method of rolling a bloom, gas-cut by the method of claim 6, further comprising chamfering the part of the end surface adjacent to the first one of the two second steel materials, the part of the end surface adjacent to the second one of the two second steel materials, the upper part and the lower part of the end surface, and rolling the bloom from the end surface side.

15. A steel material producing method of rolling a bloom, gas-cut by the method of claim 8, further comprising chamfering the part of the end surface adjacent to the first one of the two second steel materials, the part of the end surface adjacent to the second one of the two second steel materials, the upper part and the lower part of the end surface, and rolling the bloom from the end surface side.

16. A steel material producing method of rolling a bloom, gas-cut by the method of claim 9, further comprising chamfering the part of the end surface adjacent to the first one of the two second steel materials, the part of the end surface adjacent to the second one of the two second steel materials, the upper part and the lower part of the end surface, and rolling the bloom from the end surface side.

17. A steel material producing method of rolling a bloom, gas-cut by the method of claim 10, further comprising chamfering the part of the end surface adjacent to the first one of the two second steel materials, the part of the end surface adjacent to the second one of the two second steel materials, the upper part and the lower part of the end surface, and rolling the bloom from the end surface side.

18. A steel material producing method of rolling a bloom, gas-cut by the method of claim 11, further comprising chamfering the part of the end surface adjacent to the first one of the two second steel materials, the part of the end surface adjacent to the second one of the two second steel materials, the upper part and the lower part of the end surface, and rolling the bloom from the end surface side.

19. A steel material producing method of rolling a bloom, gas-cut by the method of claim 12, further comprising chamfering the part of the end surface adjacent to the first one of the two second steel materials, the part of the end surface adjacent to the second one of the two second steel materials, the upper part and the lower part of the end surface, and rolling the bloom from the end surface side.

20. A steel material producing method of rolling a bloom, gas-cut by the method of claim 13, further comprising chamfering the part of the end surface adjacent to the first one of the two second steel materials, the part of the end surface adjacent to the second one of the two second steel materials, the upper part and the lower part of the end surface, and rolling the bloom from the end surface side.

* * * * *